Figure 1:
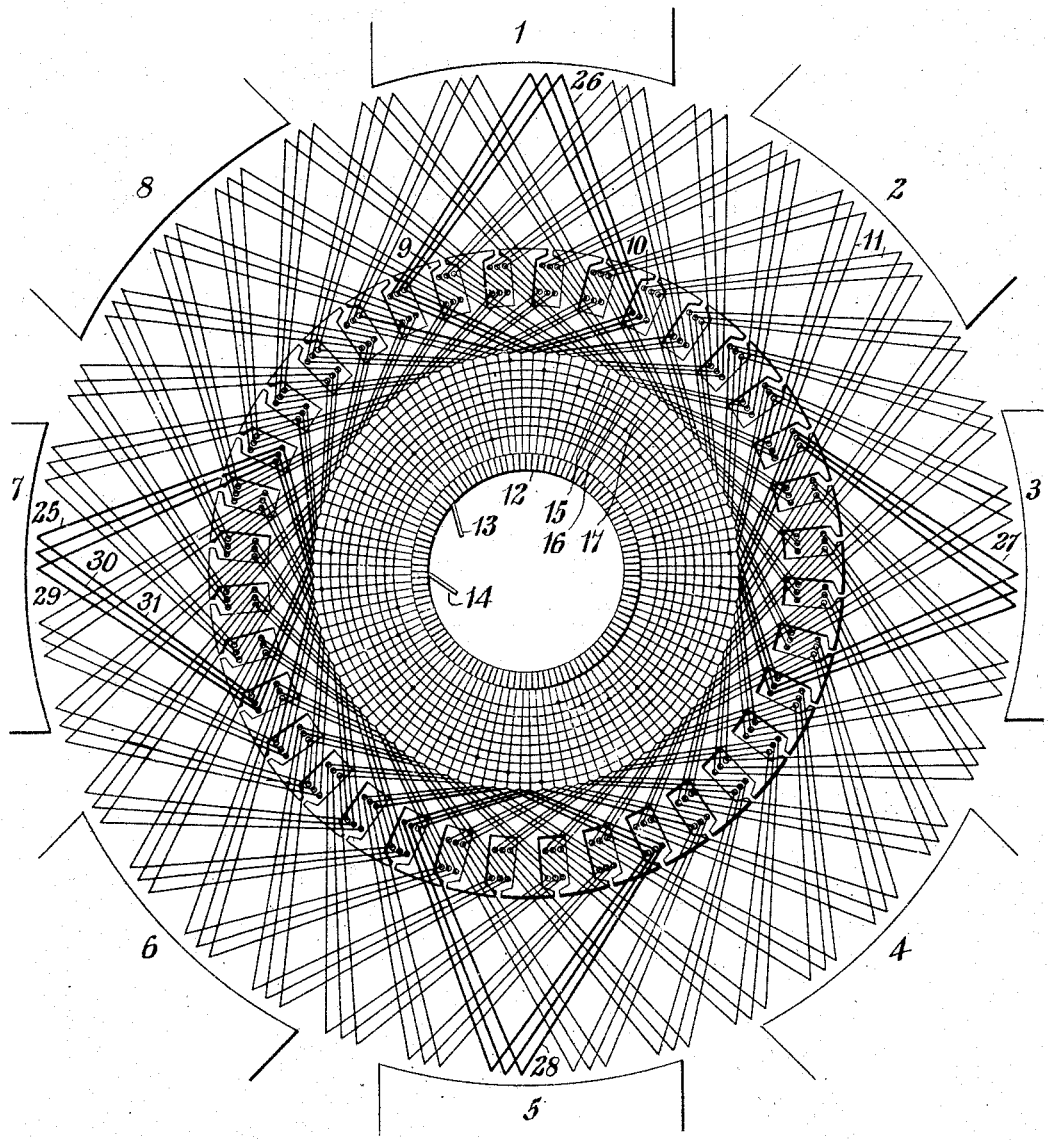

F. CONRAD.
ARMATURE WINDING.
APPLICATION FILED NOV. 3, 1906.

954,614.

Patented Apr. 12, 1910.

2 SHEETS—SHEET 1.

WITNESSES:
C. L. Belcher
Otto S. Schairer

INVENTOR
Frank Conrad
BY
Wesley G. Carr
ATTORNEY

F. CONRAD.
ARMATURE WINDING.
APPLICATION FILED NOV. 3, 1906.

954,614.

Patented Apr. 12, 1910.
2 SHEETS—SHEET 2.

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

ARMATURE-WINDING.

954,614.  Specification of Letters Patent.  Patented Apr. 12, 1910.

Application filed November 3, 1906. Serial No. 341,886.

*To all whom it may concern:*

Be it known that I, FRANK CONRAD, a citizen of the United States, and a resident of Swissvale, in the county of Allegheny and State of Pennsylvania, have invented a new and useful Improvement in Armature-Windings, of which the following is a specification.

My invention relates to armature windings for dynamo-electric machines and particularly to armature windings for motors that are operated by alternating current.

The object of my invention is to so arrange an armature winding and apply it to the core structure that sparking at the commutator, caused by short circuiting of the armature coils by the commutator brushes, may be materially reduced or substantially obviated without the employment of resistance conductors between the armature windings and the commutator segments.

Single phase alternating current motors are sometimes started as commutator motors and operated at suitable running speeds as induction motors, the armature windings being short-circuited in the latter instance so as to provide closed secondary circuits. It has also been proposed to change the number of field poles when changing from the commutator to the induction form of motor and to provide the armature windings with cross connections, that connect points of normally equal potential when operating as a commutator motor, and that short-circuit the armature windings when operating as an induction motor, such an arrangement being set forth in Patent No. 630,489. When operating as a commutator motor, the alternating field induces electromotive forces in the armature coils that are short-circuited by commutator brushes, and serious sparking at the commutator often results therefrom. Inasmuch as the induced electromotive forces are directly proportional in value to the number of convolutions of the armature winding short-circuited by each of the brushes, they may be reduced, for the purpose of reducing the sparking at the commutator, by providing a large number of commutator segments and correspondingly diminishing the number of convolutions between adjacent commutator segments. In so doing, it has also been found expedient to place a plurality of armature coils in each of the core slots in order that the number of core slots and the diameter of the armature may not be unduly large. When cross connections are employed, as above indicated, a plurality of the armature coils are connected in parallel relation and only a single pair of commutator brushes need be employed, though the currents in the closed secondary armature circuits that are established by the brushes will be correspondingly increased in amount. If resistance conductors are employed between the armature winding and the commutator segments to assist in reducing the sparking it is consequently necessary to provide them with an increased amount of resistance in order that the amount of current may be effectually reduced. Such conductors, together with a like number of cross connecting conductors, occupy considerable space in the armature structure and a very complicated arrangement results.

According to my present invention, only the terminals of the groups of coils that are located in the respective core slots and are correspondingly disposed with respect to field poles of like polarity when operating as a commutator motor, are connected by the cross connecting conductors. The latter are, therefore, equal in number to the number of core slots, and the result is that the electromotive forces induced in some of the coils of the armature winding that are included in the short-circuited portions are opposed to those induced in other coils, and the currents in the temporarily closed secondary circuits are so reduced in amount that the employment of resistance conductors may be rendered unnecessary.

Figure 2:
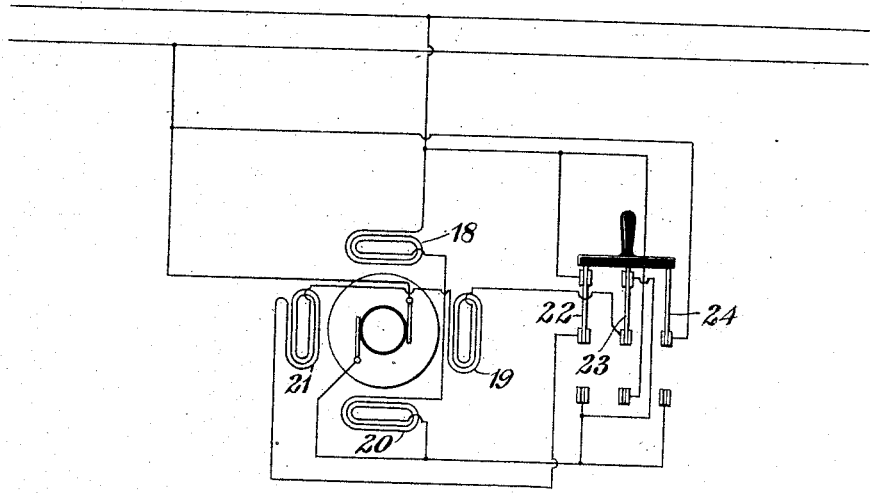
Figure 3:
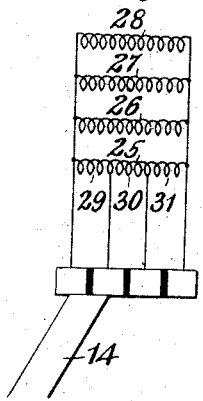
Figure 4:
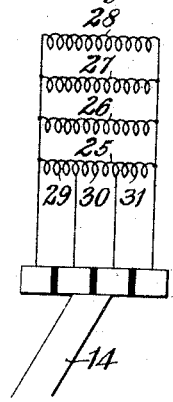

Figure 1, of the accompanying drawing, is a diagrammatic view of an armature winding embodying my invention. Fig. 2 is a diagrammatic view of the field circuits of the motor, and Figs. 3 and 4 are diagrammatic views of portions of the armature winding.

Mounted within the field magnet of a motor, which, for starting and low speed running, may be provided with eight field poles such as those indicated at 1, 2, 3, 4, 5, 6, 7, and 8 of Fig. 1, and, for high speed running, may be arranged to have but four field poles, is an armature core 9 having slots 10. The armature is provided with a winding comprising a plurality of coils 11 one or more of which may be placed in the same core slots, the winding being in this manner divided into groups of coils. The terminals of the coils are connected respectively to the segments of a commutator cylinder 12 with which engage a pair of brushes 13 and 14 that are of insufficient width to span more than two commutator segments. The terminals of the groups of coils occupying slots that are correspondingly located with respect to field poles of like polarity when the field has eight poles, are connected, respectively, by means of a plurality of cross connecting conductors 15, 16, 17, etc., that will usually be equal in number to the number of the armature core slots divided by the smaller number of field poles. In the present instance, there are thirty-six armature core slots and nine cross connecting conductors. The field magnet may be provided with four coils 18, 19, 20, and 21 connected in series parallel relation and so arranged that eight poles are produced for starting and slow speed running and four poles for high speed running. The change from eight to four poles is made by means of switches 22, 23, and 24 that may be, and preferably are, operated automatically when the motor attains a predetermined speed, as set forth in another application Serial No. 341,885, filed by me of even date herewith.

It may be seen, from an inspection of Fig. 1, that the cross-connecting conductors 15, 16, 17, etc., connect points in the armature winding of normally equal potential when the motor operates as a commutator motor having eight poles. Consider, for instance, the groups of coils 25, 26, 27, and 28, the respective terminals of which are connected by means of the conductors 15 and 16. Each of these groups occupies a corresponding position with respect to alternate field poles 1, 3, 5, and 7 that are consequently of the same polarity. It will also be observed that coil 29 of the group 25 is short-circuited directly by the brush 14 and that the groups of coils 26, 27, and 28 are connected in parallel relation in a closed circuit that also includes the remaining coils 30 and 31 of the group 25. These conditions are clearly illustrated in Fig. 3. The electromotive forces that are induced in the groups of coils 26, 27, and 28 by the alternating field are in the same direction but are opposed to those induced in the coils 30 and 31 of the group 25, and, since each of the parallel-connected groups comprises three coils, the electromotive forces of which are opposed by the electromotive force induced in two coils of the remaining group, the electromotive force causing the flow of current in the closed circuit is equal only to that induced in a single armature coil. The current caused to traverse the parallel-connected groups of coils 26, 27, and 28 is equal only to that which is caused to traverse the coil 29 of the group 25 by the electromotive force induced therein because each of the groups comprises three times the resistance. The coils 30 and 31 consequently serve the purpose that is usually served by resistance leads located between the armature winding and the commutator segments, i. e., they reduce the amount of current that traverses the temporarily closed secondary circuits to an amount that may be easily commutated by the brushes. If the brush 14 directly short-circuits the armature coil 30, as indicated in Fig. 4, the electromotive force induced in the coils 29 and 31 of the group 25 will be opposed to the electromotive force induced in the groups of coils 26, 27, and 28, and the resistance of these coils will also be interposed in the temporarily closed secondary circuit that includes the groups of coils 26, 27, and 28 the effect being as before explained.

It will be observed that not only has the number of cross-connecting conductors been greatly reduced, but that, by properly adjusting the resistances of the armature coils, the necessity for resistance leads may be entirely obviated, since portions of the winding may be, according to the present invention, caused to serve the usual function pertaining thereto.

Obviously the numbers of armature core slots, commutator segments, cross-connecting conductors and field poles here selected are only for purposes of illustration and may be varied at will to suit any given conditions, and the numbers of the field poles for starting and for running conditions may also bear any suitable relation, other than the ratio of 1 to 2, as here shown and described, without departing from the spirit of the invention.

I claim as my invention:

1. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively, to the normally equal-potential terminals of the groups of coils.

2. In a dynamo-electric machine, the combination with a commutator cylinder comprising a plurality of segments, a slotted armature core and a winding therefor comprising a plurality of coils that are connected consecutively to adjacent commutator segments and are arranged in groups, all of the coils of each group being located in the same core slots, of conductors connected, respectively, to the normally equal-potential terminals of the groups of coils, the number of said conductors being equal to the number of armature slots divided by the number of pairs of field poles.

3. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively, to the terminals of as many groups of coils as there are pairs of field poles.

4. In a dynamo-electric machine, the combination with a commutator cylinder comprising a plurality of segments, the slotted armature core, and a winding therefor comprising a plurality of coils that are connected consecutively to adjacent commutator segments and are arranged in groups, all of the coils of each group being located in the same core slots, of conductors connected, respectively, to the terminals of the groups of the coils that are correspondingly located with respect to the field poles.

5. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors that connect in parallel relation the groups of coils which are correspondingly located with respect to the field poles.

6. In a dynamo-electric machine, the combination with a field magnet the number of poles of which may be changed, a commutator cylinder comprising a plurality of segments, and a slotted armature core, of a winding for the armature comprising a plurality of coils that are connected consecutively to adjacent commutator segments and are arranged in groups, all of the coils of each group being located in the same core slots, and conductors connected, respectively to the terminals of the groups of coils that are of normally equal potential when the field has the larger number of poles.

7. In a dynamo-electric machine, the combination with a field magnet the number of poles of which may be changed, a commutator cylinder comprising a plurality of segments, and a slotted armature core, of a winding for the armature comprising a plurality of coils that are connected consecutively to adjacent commutator segments and are arranged in groups, all of the coils of each group being located in the same core slots, and conductors connected, respectively, to the terminals of the groups of coils that are of normally equal potential when the field has the larger number of poles, the number of said conductors being equal to the number of armature slots divided by the larger number of pairs of field poles.

8. In a dynamo-electric machine, the combination with a field magnet a number of poles of which may be changed, a commutator cylinder comprising a plurality of segments, and a slotted armature core, of a winding for the armature comprising a plurality of coils that are connected consecutively to adjacent commutator segments and are arranged in groups, all of the coils of each group being located in the same core slots, and conductors connected, respectively, to the terminals of the groups of coils that are correspondingly located with respect to the field poles when the field has the larger number of poles.

9. In a dynamo-electric machine, the combination with a field magnet the number of poles of which may be changed, a commutator cylinder comprising a plurality of segments, and a slotted armature core, of a winding for the armature comprising a plurality of coils that are connected consecutively to adjacent commutator segments and are arranged in groups, all of the coils of each group being located in the same core slots, and conductors connected, respectively, to the terminals of the groups of coils that are correspondingly located with respect to the field poles when the field has the larger number of poles, the number of said conductors being equal to the number of armature slots divided by the larger number of pairs of field poles.

10. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively to the normally equal-potential terminals of the groups of coils, and brushes that may engage not more than two adjacent commutator segments.

11. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively, to the normally equal-potential terminals of the groups of coils, and a single pair of brushes engaging the commutator cylinder.

12. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors that are connected, respectively, to the normally equal-potential terminals of the groups of coils, and a smaller number of pairs of commutator brushes than there are pairs of field magnet poles.

13. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively, to the normally equal-potential terminals of the groups of coils, and a smaller number of pairs of commutator brushes than there are pairs of field magnet poles, the brushes being of insufficient width to engage more than two adjacent commutator segments.

14. In a dynamo-electric machine, the combination with a commutator cylinder comprising a plurality of segments, a slotted armature core, and a winding therefor comprising a plurality of coils that are connected consecutively to adjacent commutator segments and are arranged in groups, all of the coils of each group being located in the same core slots, of conductors connected, respectively, to the normally equal-potential terminals of the groups of coils, and a single pair of brushes engaging the commutator cylinder, each brush being of insufficient width to engage more than two adjacent commutator segments.

In testimony whereof, I have hereunto subscribed my name this 31st day of October, 1906.

FRANK CONRAD.

Witnesses:
WM. BRADSHAW,
BIRNEY HINES.